No. 846,010. PATENTED MAR. 5, 1907.
M. J. CORBELL.
COOKING VESSEL.
APPLICATION FILED AUG. 24, 1906.
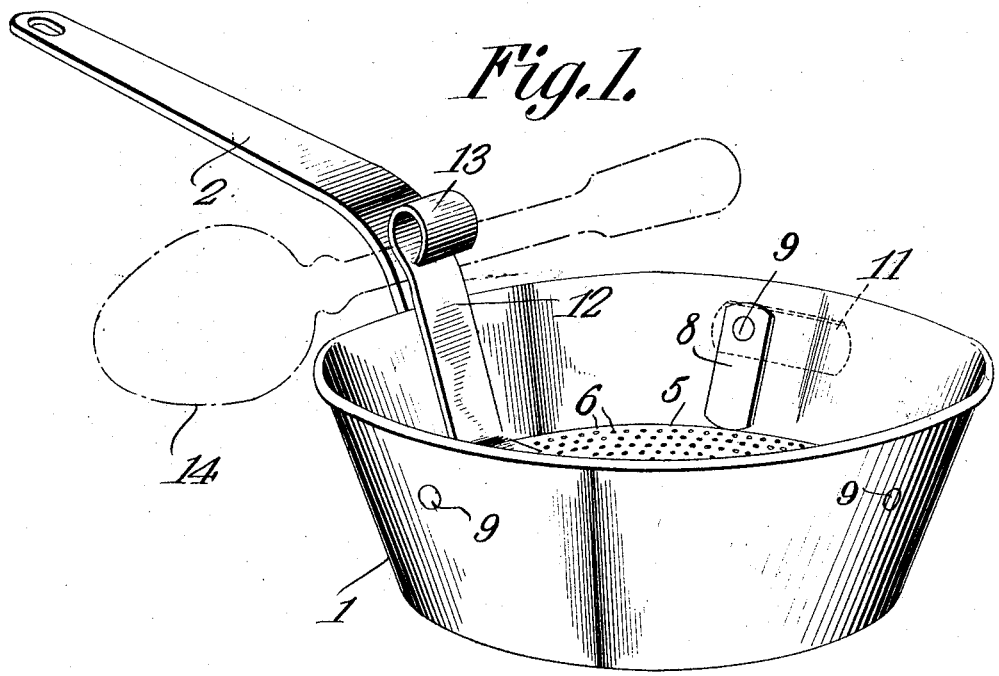
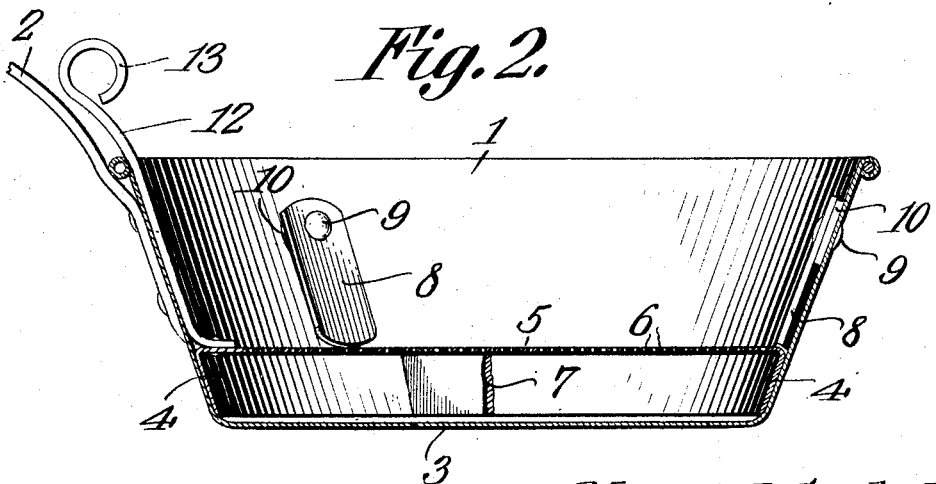
WITNESSES:
Mary J. Corbell,
INVENTOR.
By C. A. Snow & Co.
ATTORNEYS

UNITED STATES PATENT OFFICE.

MARY J. CORBELL, OF MURFREESBORO, ARKANSAS.

COOKING VESSEL.

No. 846,010.  Specification of Letters Patent.  Patented March 5, 1907.

Application filed August 24, 1906. Serial No. 331,935.

*To all whom it may concern:*

Be it known that I, MARY J. CORBELL, a citizen of the United States, residing at Murfreesboro, in the county of Pike and State of Arkansas, have invented a new and useful Cooking Vessel, of which the following is a specification.

This invention relates to cooking vessels—such, for instance, as a preserving or jam pan—and relates more particularly to an improved cooking vessel provided with a false bottom on which the fruit and seeds are supported off the bottom of the kettle, so as to prevent scorching during cooking.

The invention has for one of its objects to improve and simplify the construction and operation of this class of devices, so as to render the same comparatively inexpensive, durable, and easy to use and clean.

A further object of the invention is to provide a false bottom of simple and substantial construction which may be used in ordinary cooking vessels as an attachment thereror or with a special form of vessel that will be hereinafter fully set forth.

With these objects in view and others, as will appear as the nature of the invention is better understood, the invention comprises the various novel features of construction and arrangement of parts, which will be more fully described hereinafter and set forth with particularity in the claim appended hereto.

In the accompanying drawing, which illustrates one of the embodiments of the invention, Figure 1 is a perspective view of a preserving-pan with a false bottom in position. Fig. 2 is a central vertical section thereof.

Corresponding parts in the several figures are indicated throughout by similar characters of reference.

Referring to the drawing, 1 designates the body of the cooking vessel or pan, which may be of any desired shape or size and made of any approved material, such as agate-ware, tin, sheet-iron, copper, aluminium, or the like. The vessel is provided with a suitable handle, which may take the form of a bail or of a skillet-handle 2, as shown.

Arranged within the body of the cooking vessel is a false bottom designed to support the fruit or other food to be cooked off the bottom 3 of the cooking vessel, so as to prevent scorching or burning of the fruit by the intense heat of the fire or flame. The false bottom is preferably constructed of sheet metal cut in the form of a disk and provided with a downwardly-turned peripheral flange 4, which contacts on the inner surface of the wall of the body 1. This flange contributes to stiffen the false bottom, so as to prevent buckling on the latter. The body portion 5 of the false bottom is provided with a large number of perforations (indicated at 6) so as to permit the water, liquid, or juice to freely circulate between the bottom and top sides of the false bottom. Instead of making the false bottom of one piece, as shown, the reticulated portion 5 thereof may be substituted by gauze or any other suitable material. In order to further stiffen and reinforce the false bottom, one or more diametrically-extending reinforcing-ribs are employed. A portion of one of these is indicated at 7. This rib is in the nature of a strip suitably secured on the under side or the portion 5 by soldering the upper edge of the strip thereto. The ends of the strip or rib terminate at the flange 4 and are soldered, riveted, or otherwise suitably secured thereto.

The false bottom may in some instances be held in place by means of the rim 4 thereof frictionally engaging with the inner surface of the vessel-body 1. In order, however, to positively hold the bottom in place, so as to prevent the same from floating, a plurality of locking devices—such, for instance, as buttons 8—are employed. These buttons are each pivotally mounted on rivets 9, which extend through perforations in the side of the body 1. Between each button and the wall of the vessel is arranged a washer 10, that encircles the shank of the rivet and serves as a spacer, so as to hold the button a suitable distance away from the wall of the kettle in order that it can be turned to the dotted-line position, (indicated at 11, Fig. 1.) The lower ends of the buttons, of which latter there are three in the present instance, are adapted to engage the false bottom when they are turned down in their full-line position, as shown. When it is desired to move the false bottom, the buttons are turned so that they will extend with their length in a horizontal plane, so as to be out of the way on the false bottom when it is taken out.

In order to facilitate the removal of the false bottom, a handle of any suitable form may be provided. The handle may with advantage be located at one side, as indicated at 12, so that the contents of the vessel can be stirred without the handle interfering, as would be the case if the latter were placed at the center. Another advantage of locating the handle at the side is that it can coöperate with the handle 2 of the vessel and form therewith a spoon-holder, as shown in Fig. 1. The lower end of the handle 12 is riveted or otherwise suitably secured to the false bottom, and the upper end extends out of the cooking vessel, where it is formed into a handhold 13. One portion of the handhold lies in close proximity to the handle 2 of the cooking vessel, and between the two a spoon (indicated by dotted lines at 14) can be inserted and gripped between them.

I have described the principle of operation of the invention, together with the apparatus which I now consider to be the best embodiment thereof; but I desire to have it understood that the apparatus shown is merely illustrative and that various changes may be made when desired as are within the scope of the invention.

What is claimed is—

The combination of a cooking vessel provided with a handle extending laterally therefrom, a false bottom in the vessel, means on the vessel for removably holding the false bottom in place, and a handle secured at one end to the said bottom and extending upwardly out of the vessel and shaped to be adapted to project over a portion of the vessel-handle to permit a spoon to be inserted and held between the two handles.

In testimony that I claim the foregoing as my own I have hereto affixed my signature in the presence of two witnesses.

MARY J. CORBELL.

Witnesses:
  Jos. C. Pinnix,
  James H. Webb.